United States Patent

Hinderks

[11] Patent Number: 5,301,363
[45] Date of Patent: Apr. 5, 1994

[54] METHOD AND APPARATUS FOR ADAPTIVE POWER ADJUSTMENT OF MIXED MODULATION RADIO TRANSMISSION

[75] Inventor: Larry W. Hinderks, Holmdel, N.J.

[73] Assignee: Corporate Computer Systems, Inc., Holmdel, N.J.

[21] Appl. No.: 905,945

[22] Filed: Jun. 29, 1992

[51] Int. Cl.$^5$ .................... H04B 1/02; H04B 1/10
[52] U.S. Cl. ......................... 455/101; 455/103; 455/296; 375/99
[58] Field of Search ............... 455/67.3, 63, 88, 74, 455/49.1, 101, 102, 103, 104, 105, 115, 126, 127, 206, 212, 214, 218, 221, 222, 223, 295, 296, 93; 375/5, 7, 102, 99, 104, 40, 103, 58, 60; 370/69.1, 71, 110.4; 381/37

[56] References Cited

U.S. PATENT DOCUMENTS

| | | | |
|---|---|---|---|
| 3,337,865 | 8/1967 | List | 455/101 |
| 4,253,193 | 2/1981 | Kennard et al. | 455/101 |
| 4,859,958 | 8/1989 | Myers | 329/112 |
| 4,972,484 | 11/1990 | Theile et al. | 381/37 |
| 4,972,510 | 11/1990 | Guizerix et al. | 455/218 |
| 4,996,717 | 2/1991 | Koening | 455/222 |
| 5,146,610 | 9/1992 | Longshere et al. | 455/218 |

Primary Examiner—Reinhard J. Eisenzopf
Assistant Examiner—Lisa Charouel
Attorney, Agent, or Firm—Townsend & Townsend Khourie & Crew

[57] ABSTRACT

A method and apparatus for adjusting the power level and spectral content of a digital signal which is transmitted at the same frequency as an audio signal which is modulated via analog modulation method so that the receiver receiving the audio signal is not perceptibly impaired and the power of the digital signal is maximized. The transmission and reception system comprises at least two transmitters for transmitting first and second signals. The first transmitter transmits an audio signal via an analog modulation technique and the second transmitter transmits digital information. A first and second receiver for receiving the two different signals, a power adjustment controller, and processor for adjusting the power of the second digital signal in relation to the first audio frequency range signal at the transmitters. The transmission system transmits the first and second signals to both receivers within a single channel. To allow the power level of the second transmitter to be maximized, the present invention takes advantage of the psychoacoustic effects properties of auditory perception. The power adjustment controller manipulates the second transmitted signal so that the noise induced into the first receiver is below the global masking threshold of the audio signal modulating the first transmitter. Thus, the noise induced by the second transmitted signal cannot be perceived by the human ear and is effectively eliminated.

8 Claims, 4 Drawing Sheets

METHOD AND APPARATUS FOR ADAPTIVE POWER ADJUSTMENT OF MIXED MODULATION RADIO TRANSMISSION

BACKGROUND OF THE INVENTION

The invention relates to a method and apparatus for transmission of digital signals via digital modulation (Mary-PSK, Mary-QAM, FSK or their derivatives) from one transmitter to a single receiver tuned to receive signals within a single frequency channel in the presence of an interfering transmitter that is transmitting audio signals via an analog modulation technique (AM, FM or their derivatives).

The standard RF transmission system consists of a single transmitter and a single receiver. The input to the transmitter is a base-band signal such as an audio program. The transmitter converts the base-band signal into an RF signal which is transmitted on a communication channel through space. Various modulation techniques exist for the conversion of a base-band signal to an RF signal. Representative techniques for analog signal modulation are AM and FM modulation.

A receiver receives and converts the modulated RF signal back into a base-band signal. A perfectly functioning transmitter/receiver pair delivers a perfect copy of the transmitted base-band signal to the receiver through a noise free channel.

The conventional RF transmission system is designed to transmit and receive a single transmitted signal on a single channel. However, if a transmitter utilizing digital modulation transmits a signal to a receiver designed to detect and demodulate analog modulated signals on the same channel as the digitally modulated signal, the analog receiver's base-band output of the digital signal would be essentially noise. The level of noise induced by the interfering digital transmission is related to the power and the type of the interfering signal at the receiver. The spectra of the received base-band signal resulting from the digital modulated transmitter is a function of the type of digital modulation of the interfering transmitter and the analog detection scheme of the receiver.

In the system 100 shown in FIG. 1, a problem arises because both transmitters are transmitting at the same frequency. Thus, receiver 120 receives the signals from both transmitters 110 and 130 as does receiver 140. A means of separating the desired and the undesired signals in each receiver 120, 140 must be provided if each receiver is to function properly.

Receiver 120 is expecting and can correctly demodulate the signal from transmitter 110. It considers the signal from 130 as an interfering signal. A similar situation occurs for receiver 140 with the roles of the desired and interfering transmitter reversed.

A possible strategy to allow such a dual transmitter/receiver system to operate is to lower the power level of transmitter 130 until receiver 120 functions acceptably. In this case, however, receiver 140 must provide a means for eliminating the interference caused by transmitter 110. With this technique. it is clear that the lower the power of transmitter 130, the less interference induced into receiver 120 and the harder it will be to eliminate the interference induced by transmitter 110 at receiver 140. With this technique, only one interference canceller is needed.

A system which allows transmitter 130 to transmit at the highest possible power levels and not introduce perceptible interference at receiver 120 is needed so that the interference canceling system needed at receiver 140 can now be as simple as possible.

SUMMARY OF THE INVENTION

According to the invention a method and apparatus are provided for broadcast transmission of at least two signals suitable for audio signal recovery in a single receiver. The transmission and reception system comprises at least two transmitters for transmitting first and second audio frequency range signals, a single receiver, a power adjustment controller, and means for adjusting the power of the second audio frequency range signal in relation to the first audio frequency range signal at the transmitters. The transmission system transmits the first and second signals within a single channel to a single receiver so that the second signal appears as noise within the first transmitted signal. To eliminate system noise, the present invention takes advantage of the psychoacoustic effects properties of auditory perception. The power adjustment controller at the transmitter is manipulated by the adjusting means so that the second transmitted signal is set to be below the global masking threshold associated with the psychoacoustic effects. Thus, the second transmitted signal cannot be perceived by the human ear and noise in the auditory frequency range is effectively eliminated.

A further understanding of the nature and advantages of the invention may be realized by reference to the remaining portion of the specifications in the drawings.

DESCRIPTION OF THE SPECIFIC EMBODIMENTS

Figure 1:
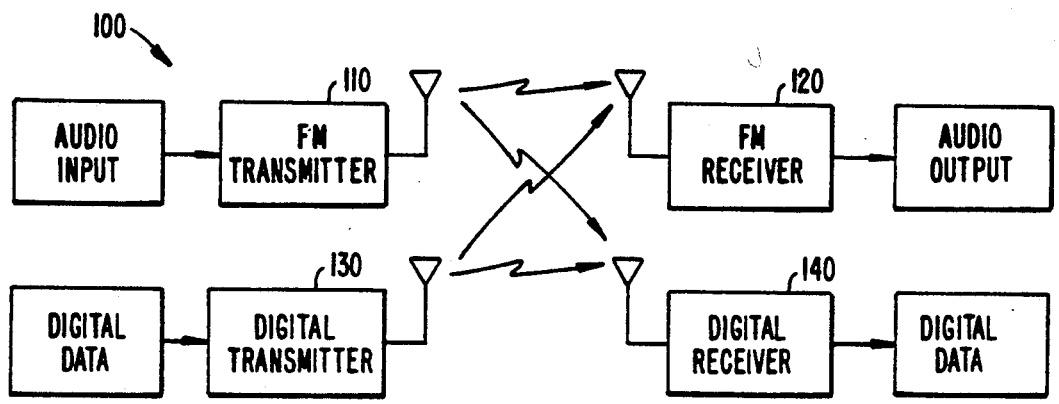
FIG. 1 is a block diagram of a dual transmitter/dual receiver transmission system of the prior art.
Figure 2:
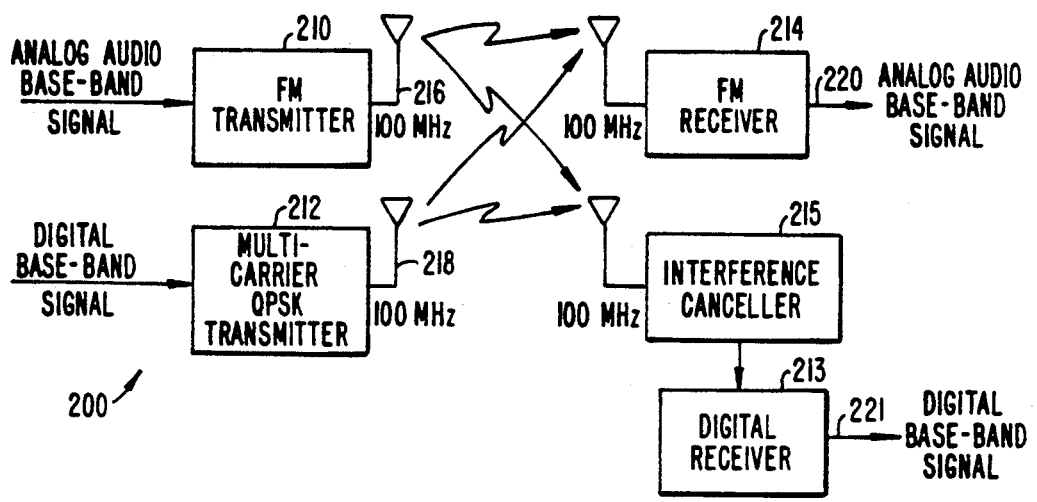
FIG. 2 is a block diagram of a dual transmitter and pertinent receiver transmission system.

FIG. 2 illustrates the dual transmitter/receiver transmission system in block diagram form. The transmission system 200 comprises an FM transmitter 210, a digital transmitter 212, an analog receiver 214 and a digital receiver 213. FM transmitter 210 is for transmitting an analog audio base-band signal 216 to receiver 214. Digital transmitter 212 is for transmitting a digital base-band signal 218 to receiver 213. In the example illustrated in FIG. 2, both transmitters 210, 212 operate to modulate a base-band signal to the same frequency channel (e.g., 100 MHz with 200 KHz channel width). The modulated RF spectra occupy approximately the same bandwidth. In FIG. 2, the receiver 214 detects an analog audio base-band signal 220 which is the image of the transmitted analog signal 216 plus noise. The noise is the sum of the electronic noise generated in the receiver 214 plus noise induced by the presence of the interfering digital signal 218. Receiver 213 receives the sum of 216, 218 and electrical noise.

The present invention allows the power of transmitter 212 (see FIG. 2) to be dynamically adjusted instantaneously to a maximum value and induce no perceptible noise into the demodulated signal 220. This maximum power value varies with time and depends on the audio content of the baseband signal used to modulate 210. The maximum power value also depends on the types of modulation used for transmitters 210 and 212. This invention is applicable if two signals 216 and 218 are transmitted at the same frequency and signal 216 is higher power and is modulated with audio information which is to be demodulated and listened to by a human ear and signal 218 generates audible noise in the demodulated audio signal of 216.

The transmission and reception system 200 comprises at least two transmitters for transmitting the two signals, two receivers, a power adjustment controller, an interference canceller and a means for adjusting the power of the second signal in relation to the first signal. The transmission system transmits the first 216 and second 218 signals 216 and 218 respectively within a single channel to the respective receivers so that the second signal appears as noise at the demodulated output of the first receiver 220. To eliminate this audible noise output from receiver 214 induced by signal 218, the present invention takes advantage of the psychoacoustic effects properties of auditory perception. The power adjustment controller at the transmitter is manipulated by an adjusting means so that the second transmitted signal is set to be below the global masking threshold associated with the psychoacoustic effects of the audio signal transmitted by 210 and received by 214. Thus, the noise induced by the second transmitted signal cannot be perceived by the human ear and noise in the auditory frequency range is effectively eliminated.

Figure 3:
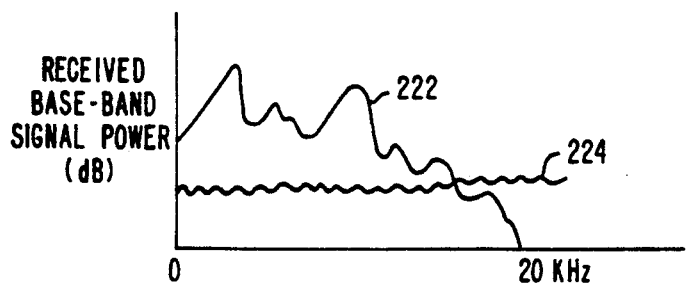
FIG. 3 is a spectral diagram of the signal from a dual transmitter/pertinent receiver transmission system without modification by a power adjustment controller unit.

FIG. 3 illustrates the power spectrum of the two received signals. Spectra 222 is a result of the signal transmitted by transmitter 210 if transmitter 212 were turned off. Spectra 224 is the result of the signal transmitted by 218 if transmitter 210 were turned off. The actual spectra of the received signal 220 would be the composite of 222 and 224 if both 216 and 218 are transmitting at the same frequency.

The level of the noise 224 induced by the interfering digital transmitter 212 is related to the power of the transmitter. In order to receive the digital signal in the receiver 213, the signal power level of the interfering signal 218 must be as large as possible yet not so high as to interfere with the primary analog audio base-band signal 216 received by receiver 214. Although an increased power level of the interfering digital transmitter signal 218 would make its reception by digital receiver 213 less error prone, it would also increase the noise generated in the audio base-band signal of receiver 214. One can take advantage of psychoacoustic properties of audio perception so that the power level of transmitter 212 can be raised to its maximum level without inducing noise which is audible to the human ear. The interference canceller 215 is used to reduce the signal transmitted by 210 to acceptable levels so that receiver 213 functions acceptably.

Figure 4:
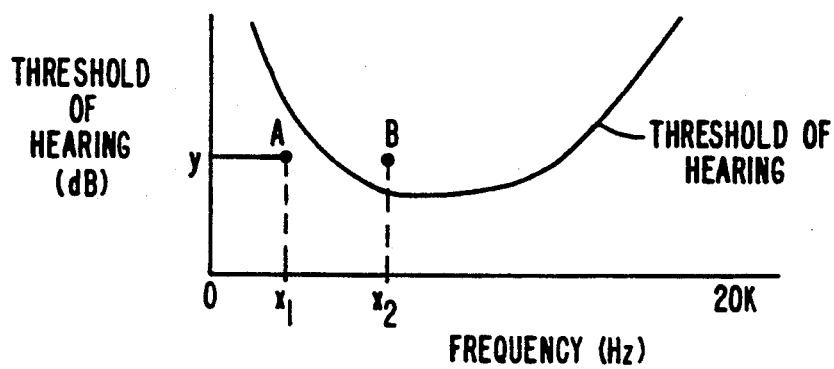
FIG. 4 is a power spectrum diagram illustrating the threshold of hearing curve.

The present invention takes advantage of two well known psychoacoustic principles. These principles are further discussed in U.S. Pat. No. 4,972,484. The first psychoacoustic principle relates to the threshold of hearing. Signals below a certain amplitude threshold cannot be perceived by the human ear. FIG. 4 is a power spectrum diagram illustrating the threshold of hearing curve versus frequency for a typical individual having normal hearing. Signal A at frequency $X_1$, with amplitude Y is below the threshold of hearing and thus cannot be heard. Signal B, although at the same amplitude level Y, is above the threshold of hearing at frequency $X_2$ and therefore can be perceived by the human ear.

Figure 5:
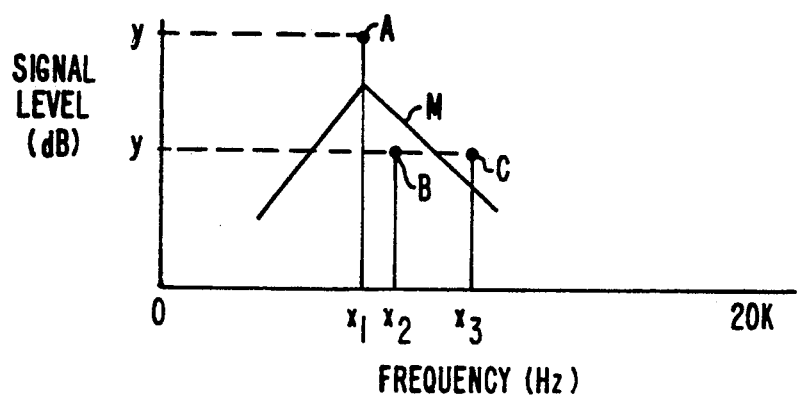
FIG. 5 is a spectral diagram illustrating a masking skirt for a masking tone A.

A second psychoacoustic principle used by the present invention is frequency masking. The human ear cannot hear a low amplitude tone which is close in frequency to a high amplitude tone. A masking skirt is generated by a high amplitude tone under which another tones are not audible to the human ear. The exact shape of the masking skirt is a function of the amplitude and frequency of the masking tone. FIG. 5 illustrates three tones. Tone A at frequency $X_1$, and amplitude $Y_1$, is called the masker since it is the loudest signal in a spectral region. The tone B at frequency $X_2$ and amplitude $Y_2$ cannot be heard because it is below the masking skirt M generated by the masking tone A. The tone C at frequency $X_3$ and amplitude $Y_2$ can be heard since it is above the masking skirt M.

Figure 6:
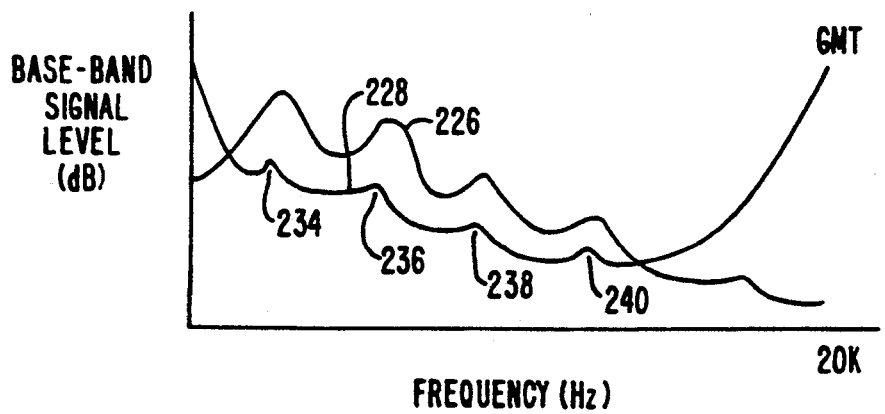
FIG. 6 is a spectrum diagram of a base band audio signal used to modulate transmitter and its associated global masking threshold of an audio signal.

Given any audio spectrum, it is possible to compute a global masking threshold (GMT) function which can be used to tell what the signal can hide. The global masking threshold is a function of both the threshold of hearing (see FIG. 4) and the masking function (see FIG. 5). FIG. 6 shows an audio signal 226 and its associated GMT 228. The GMT rises at low and high frequencies because of the threshold of hearing. It has peaks 234, 236, 238, 240 which reflect various masking frequencies in 226.

The GMT 228 is a function of time. It is considered stationary for only a time frame L and must be computed for each successive time frame if a correct value is to be maintained. In practice it may be computed less often. The human ear cannot readily perceive signals whose spectrum change more often than about every 10 milliseconds. Where digital techniques are used to compute the GMT, a sampling rate of 48,000 samples per second is appropriate. Using a 1024 point fast Fourier transform to compute the audio spectrum implies that the time window would be approximately 1024 divided by 48,000 seconds or about 21 ms.

Figure 7:
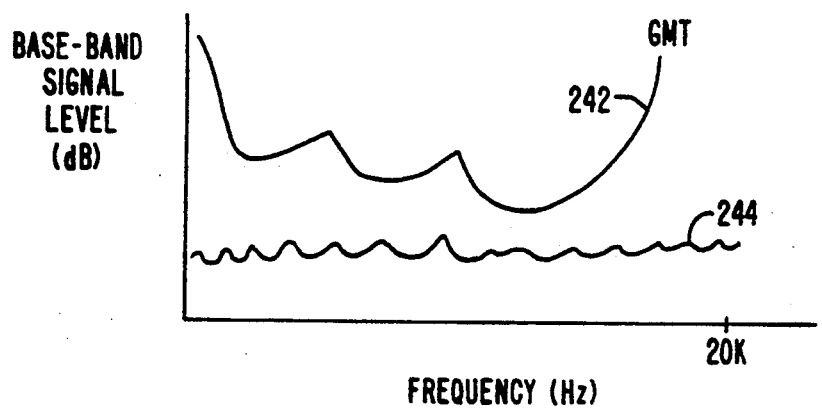
FIG. 7 is the global masking threshold for a base-band audio signal and the power spectrum of an interfering signal.
Figure 8:
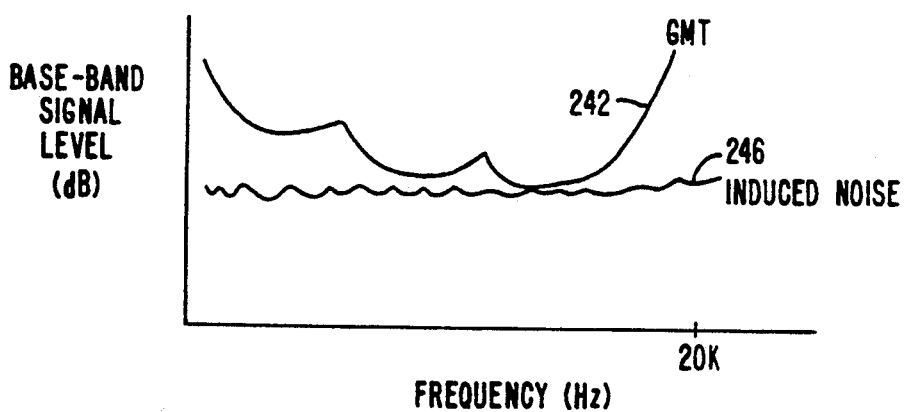
FIG. 8 is the global masking threshold for a base-band signal with the power spectrum of an interfering signal which has been power enhanced according to the invention.

FIG. 7 shows a global masking threshold 242 derived from an audio sound segment not shown. Below the curve of the GMT 242 is the noise 244 introduced by an interfering transmitter. The received bit error rate (BER) of a digital receiver is lowered (improved) if its power relative to the FM transmitter is raised. Referring to FIG. 8, in order to receive the strongest signal at the receiver, it is desirable to boost the transmitter power of the digital signal as high as possible. Because any signal less than the GMT is not audible to the human ear, the power level of the interfering transmitter signal may be boosted until the signal 246, which represents noise to the FM signal, appoaches the curve of the GMT 242.

Figure 9:
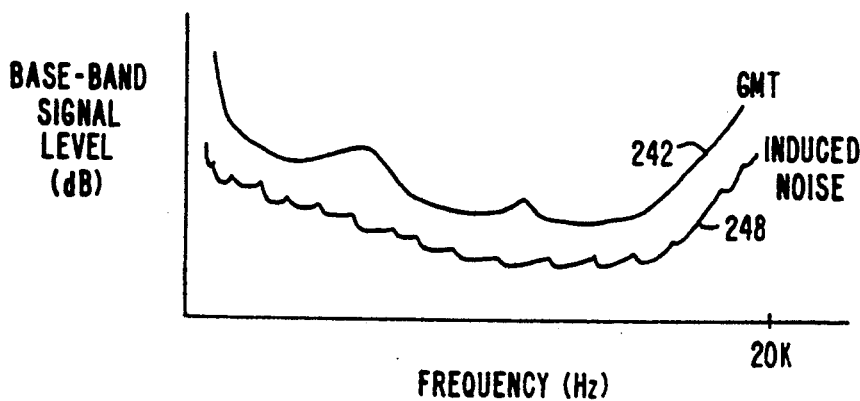
FIG. 9 is the global masking threshold for a base-band audio signal with the power spectrum of an interfering signal which has been modified by a controller according to the invention.

In order to receive a digital signal with the least number of bit errors, the power of the transmitted digital signal should be raised to cause the induced noise to be as close to the GMT 242 as possible. Therefore the transmitted digital signal 248 should be spectrally modulated to conform to the characteristics of the GMT waveform. The spectrally modulated induced noise signal 248 is illustrated in FIG. 9.

Figure 10:
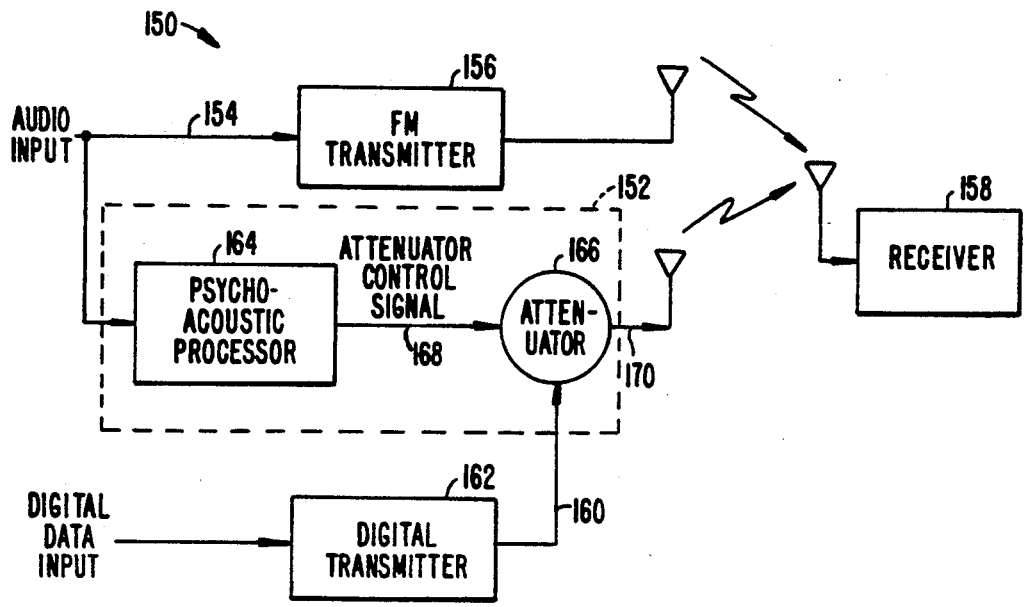
FIG. 10 is a block diagram of a transmission and power control system according to a specific embodiment of the invention.

FIG. 10 illustrates a specific embodiment of a system 150 of the present invention hereinafter called a power adaptive transmission system 150. The power adaptive transmission system 150 includes a control unit 152 for continually adjusting the power level of a digital modulation signal 160 from a transmitter 162. In the system 150, the control unit 152 specifically adjusts the RF modulation spectrum of the digital signal 160. The power adaptive transmission system 150 passes an audio input signal 154 via an FM transmitter 156 to a receiver 158. The power adapted digital signal 170 is also transmitted to the receiver 158.

The control unit 152 modulates the amplitude and if desired, the spectrum of the digital signal 160 according to the GMT of the audio signal 154. The control unit 152 comprises a psychoacoustic processor 164 and an attenuator 166. The audio input 154 is monitored at the input into the psychoacoustic processor 164. Based on the characteristics of the audio input, the psychoacoustic processor 164 determines the maximum possible digital signal power level which does not produce audible noise to the human ear. The psychoacoustic processor 164 outputs an attenuator control signal 168 which controls the attenuator 166. The attenuator 166 modulates spectral segments of the amplitude of the digital input 160 so that the signal remains within the bounds defined by the GMT threshold curve. An attenuated signal 170 is transmitted to the receiver 158.

The control unit 152 is operative to adjust the amplitude of the digital signal 160 approximately every 21 milliseconds. This creates a delay in the digital signal because of the computation time required for the GMT threshold calculation. A 21 millisecond delay must be added in the signal path of the FM signal to ensure that the digital transmitter signal is aligned with the received base-band audio signal in the FM receiver so that the masking occurs at the correct time.

Figure 11:
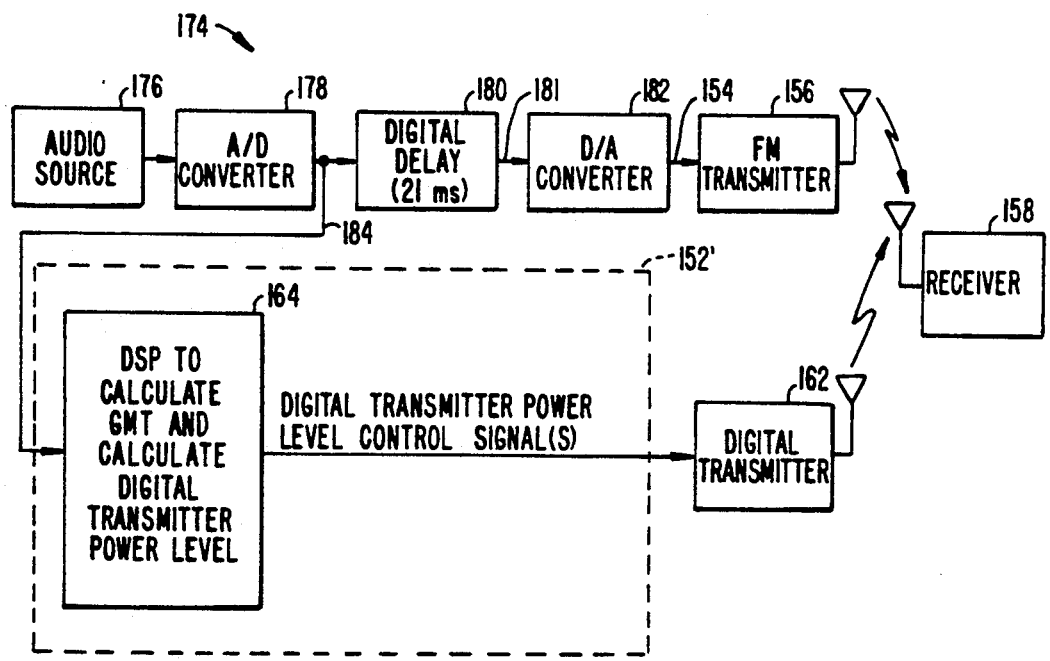
FIG. 11 is a system block diagram of a dual transmitter/pertinent receiver system with a power adjustment controller according to a specific embodiment of the invention.

FIG. 11 illustrates one embodiment of an audio channel 174 of a power adaptive transmission system 150 according to the invention. An audio source 176 applies audio signals to an A to D converter (ADC) 178. The output of the ADC 178 is applied to the input of a control unit 152' and to a digital delay unit 180, which may be a simple pipeline 21 milliseconds in duration. The delayed output 181 is applied to a D to A converter (DAC) 182 which in turn applies an analog audio modulation signal 154 to FM transmitter 156.

The control unit 152' may be a digital signal processing (DSP) unit which receives the digitized audio input 184 preframed into 21 millisecond invariant frames. On the frames, the control unit 152' employs a psychoacoustic processor 164 to calculate the GMT and there form the desired transmitter power level across the spectrum of the digital transmitter. If the digital transmitter 162 is a multicarrier type transmitter, this requires a calculation of the amplitude for each subcarrier. The control signal of signals, as a digital word or byte, may be applied directly to amplitude control input of the digital transmitter 162. Power is adjusted frame by frame across the spectrum of the digital transmitter 162.

As will be understood by those familiar with the art, the present invention may be embodied in other specific forms without departing from the spirit or essential characteristic thereof. Accordingly, the disclosure of the preferred embodiment of the invention is intended to be illustrative, but not limiting, the scope of the invention which is set forth in the following claims.

What is claimed is:

1. A multiple electromagnetic signal source/single receiver system for communicating auditory frequency range signals and digital signals, comprising:
   a first electromagnetic signal source for communicating a first audio signal;
   a receiver for receiving the first audio signal;
   a second electromagnetic signal source for communicating a second signal; and
   means coupled to the second signal source and responsive to the first audio signal for adjusting the second signal in relation to the first audio signal over a continuous amplitude range so that noise induced in the receiver by the second signal is made psychoacoustically imperceptible.

2. The multiple electromagnetic signal source/single receiver system according to claim 1, wherein the adjusting means changes a power level of the second signal to adjust the second signal in relation to the first audio signal.

3. The multiple electromagnetic signal source/single receiver system according to claim 1, wherein the adjusting means comprises a psychoacoustic processor.

4. The multiple electromagnetic signal source/single receiver system according to claim 3, wherein the psychoacoustic processor receives as input the first audio signal.

5. The multiple electromagnetic signal source/single receiver system according to claim 4, wherein the psychoacoustic processor calculates a global masking threshold of the first audio signal.

6. The multiple electromagnetic signal source/single receiver system according to claim 1, further including means for time delaying the first audio signal so that the second signal tracks time dependent characteristics of the first audio signal.

7. The multiple electromagnetic signal source/single receiver system according to claim 1, wherein the noise induced in the receiver by the second signal is below a global masking threshold, the global masking threshold being a psychoacoustic phenomenon, the global masking threshold being generated by the first audio signal, and wherein said adjusting means is operative to adjust before transmission of the second signal, so that transmission of the first audio signal is concurrent with the second signal.

8. A multiple electromagnetic signal source/single receiver system for communicating auditory frequency range signals and digital signals, comprising:
- a first electromagnetic signal source for producing a first audio signal;
- a receiver for receiving the first audio signal;
- a second electromagnetic signal source for producing a second signal; and
- means coupled to the second signal source and responsive to the first audio signal for adjusting the second signal in relation to the first audio signal so that noise induced in the receiver by the second signal is psychoacoustically imperceptible, wherein the adjusting means shapes a power spectrum of the second signal so that noise induced by the second signal at a demodulated output of the receiver conforms to and is slightly less than a global masking threshold.

* * * * *